D. F. McGILL.
AUTOMOBILE SIGNAL.
APPLICATION FILED JAN. 29, 1917. RENEWED JUNE 15, 1920.
1,374,306. Patented Apr. 12, 1921.
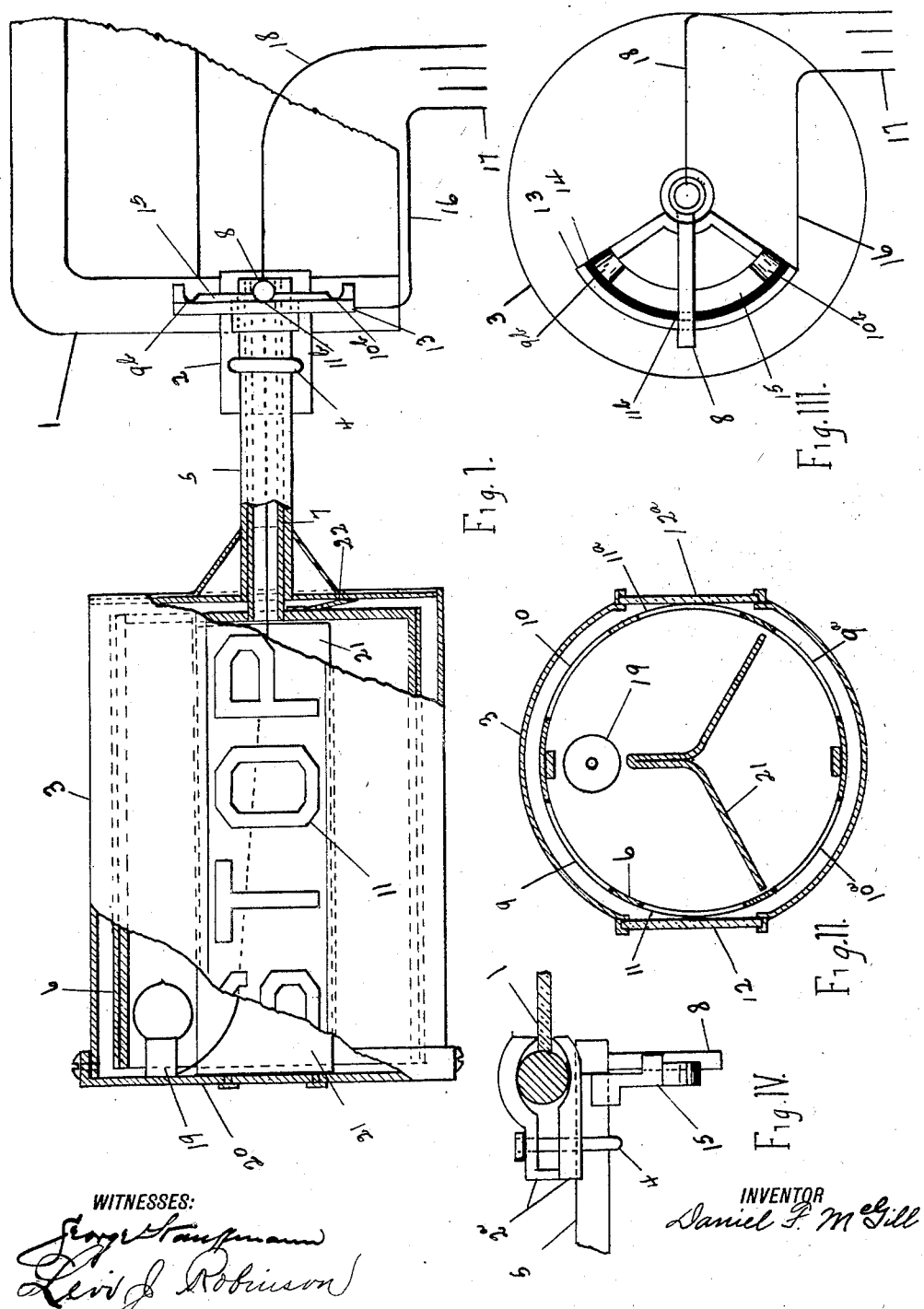

UNITED STATES PATENT OFFICE.

DANIEL F. McGILL, OF PORTLAND, OREGON.

AUTOMOBILE-SIGNAL.

1,374,306.  Specification of Letters Patent.  Patented Apr. 12, 1921.

Application filed January 29, 1917, Serial No. 145,280. Renewed June 15, 1920. Serial No. 407,260.

*To all whom it may concern:*

Be it known that I, DANIEL F. MCGILL, a citizen of the United States, residing at Portland, in the county of Multnomah and State of Oregon, have invented a new and useful Improvement in Automobile-Signals, of which the following is a specification.

This invention relates to the improvements in automobile signals in which one cylinder is made to revolve within another and has for its object to provide the words Right, Stop and Left, so that they can be read from front or rear.

A further object is to provide a means of showing the proper word, at the time desired by the operator, with a light therein so that it can be read day or night.

With these objects in view the invention consists of the novel construction and arrangement of parts as illustrated in the accompanying drawing, in which—

Figure 1 is a front elevation of a section of a wind shield of an automobile showing my improved signal applied. Fig. 2 is a cross sectional view of Fig. 1. Fig. 3 is an end view of Fig. 1, and Fig. 4 is a detail view of that portion of Fig. 1 that connects to the wind shield.

Referring to the drawing in detail, similar figures refer to similar parts throughout the several views. Character 1 represents an automobile wind shield of usual construction, 2 and 2ª represents wind shield clamps of the usual construction, which are used to clamp the cylinder 3 to the wind shield in a stationary position with the U bolt 4 around arm 5 of the signal. Cylinder 6 is made to revolve within cylinder 3 by means of arm 7 which is connected to a switch or lever 8.

In Fig. 2 the words Right 9 and 9ª can be read through glasses 12 and 12ª when the lever 8 is placed to the right in notch 9ᵇ. The words Left 10 and 10ª and Stop 11 and 11ª can be read through glasses 12 and 12ᶠ when the lever 8 is in its respective notch 10ᵇ and 11ᵇ.

When lever 8 is either in notch 9ᵇ, 10ᵇ or 11ᵇ it makes a metal contact with the strip 13 which is insulated by insulation 14, from switch board 15 but connected to wire 16 that leads to battery 17 and from battery 17 wire 18 leads to lamp 19 through arm 7 and gives a complete circuit which causes the lamp 19 to operate.

The lamp 19 is connected to head 20 and operates only when the words Right 9 and 9ª, Left 10 and 10ª or Stop 11 and 11ª are in their respective positions before the glasses 12 and 12ª.

In this manner the letters of the words are illuminated and can be read day or night at a reasonable distance.

A combination reflector and deflector 21 is connected to head 20 and extends the full length between glasses 12 and 12ª in order that the sun light will not cause the words to show up when lamp 19 is not in operation and acts as a reflector when lamp 19 is lighted to evenly distribute the light on each letter of the word before the glasses 12 and 12ª.

Spring 22 tends to keep lever 8 tight against the switch board 15 and holds it in the position placed by the operator.

Having thus described my invention what I claim is—

1. A signal device of the character referred to, comprising in combination, an outer casing provided at one end with a supporting arm, and at its opposite sides with display openings, an inner casing provided at one end with a supporting arm extending through the supporting arm of said outer casing and revoluble therein, said inner casing being provided with signal words adapted to be turned into register with said display openings, an electric lamp within said inner casing, a source of electric energy connected therewith, an operating member secured to the arm of said inner casing for turning the same, positioning means adapted to hold said operating member in different positions of adjustment, and means whereby said operating member completes the circuit connections to said lamp when moved into its different signaling positions, substantially as described.

2. An automobile signal comprising in combination, an outer casing provided at one end with a tubular supporting arm, and at its opposite sides with display openings, an inner casing provided at one end with a supporting arm extending through the tubular supporting arm of said outer casing and revoluble therein, said inner casing being provided with signal words adapted to be moved into register with said display openings, electric illuminating means with circuit connections for illuminating said signal, an operating member mounted on the outer end of the arm of said inner casing, and a coöperating member mounted at the corresponding end of the tubular arm of said outer casing, and having stop positions therein for said operating member corresponding to the positions of adjustment of said inner casing to display the signal words through the display openings of the outer casing, and electrical contacts at said stop positions adapted to be engaged by said operating member when moved thereinto for controlling said electric illuminating means, substantially as described.

DANIEL F. McGILL.

Witnesses:
F. E. SCHUAN,
JOS. J. FISHER.